United States Patent [19]
Dessouroux

[11] Patent Number: 5,460,467
[45] Date of Patent: Oct. 24, 1995

[54] AUTOMATIC POSITIVE LOCKING NUT AND RELATED DEVICE FOR LOCKING AND UNLOCKING THE NUT ON A SHAFT

[75] Inventor: Alexis Dessouroux, Verviers, Belgium

[73] Assignee: European Locking Devices S.A., Malmedy, Belgium

[21] Appl. No.: 199,127

[22] PCT Filed: Sep. 2, 1992

[86] PCT No.: PCT/BE92/00037

§ 371 Date: Feb. 24, 1994

§ 102(e) Date: Feb. 24, 1994

[87] PCT Pub. No.: WO93/05307

PCT Pub. Date: Mar. 18, 1993

[30] Foreign Application Priority Data

Sep. 3, 1991 [BE] Belgium ..................... 09100821

[51] Int. Cl.$^6$ ..................... F16B 39/10; F16B 39/284
[52] U.S. Cl. ..................... 411/248; 411/254; 411/317; 411/950
[58] Field of Search ..................... 411/7, 247–249, 411/252–254, 316–318, 432, 433, 947, 950

[56] References Cited

U.S. PATENT DOCUMENTS

| | | | |
|---|---|---|---|
| 692,572 | 2/1902 | Wilcox | 411/248 |
| 830,787 | 9/1906 | Hill | 411/318 |
| 1,414,761 | 5/1922 | Thamann | 411/317 |
| 1,555,576 | 9/1925 | Hokanson | 411/248 |
| 3,167,105 | 1/1965 | Rosan | 411/7 X |
| 3,422,869 | 1/1969 | Lanius, Jr. | 411/254 |
| 5,215,336 | 6/1993 | Worthing | 411/280 X |

*Primary Examiner*—Neill R. Wilson
*Attorney, Agent, or Firm*—Chilton, Alix & Van Kirk

[57] ABSTRACT

A locking nut for use with a shaft having a serrated thread employs a segmented, radially expandable locking element having serrations on its internal diameter. The locking element is disposed in a counterbore of the nut and is axially movable between a first locked position and a second unlocked position. The locking element is resiliently biased toward the axis of rotation of the nut and is also resiliently radially biased axially to the locked position. The nut is unlocked by overcoming the axial resilient bias and driving the locking element segments up a radially diverging ramp provided within the nut against the resilient radial bias.

20 Claims, 9 Drawing Sheets

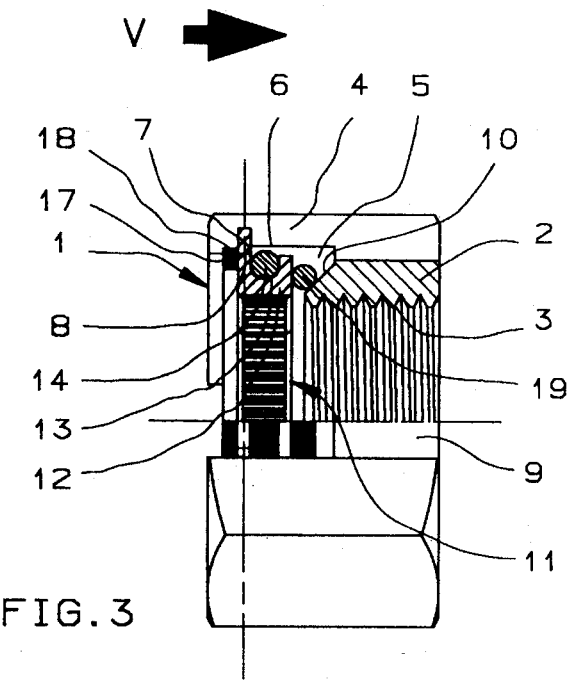
FIG.3
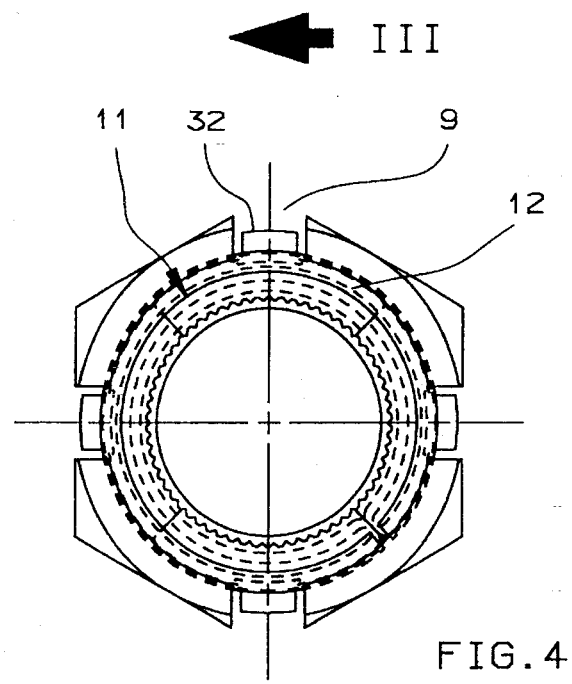
FIG.4
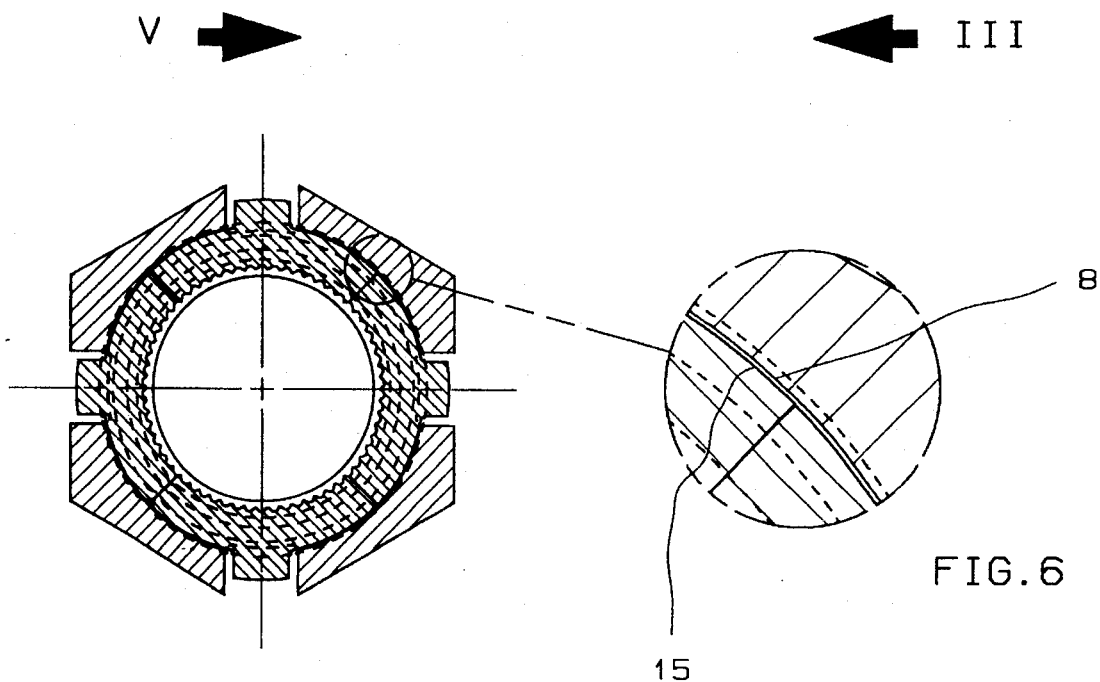
FIG.5
FIG.6

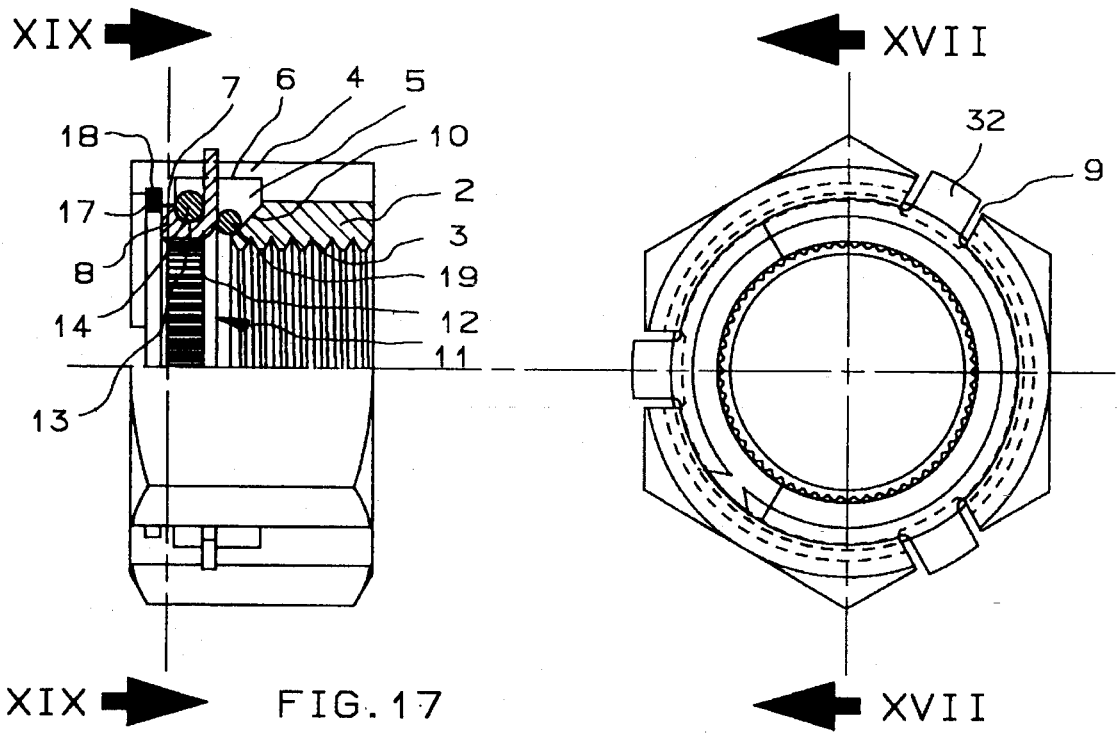
FIG. 17
FIG. 18
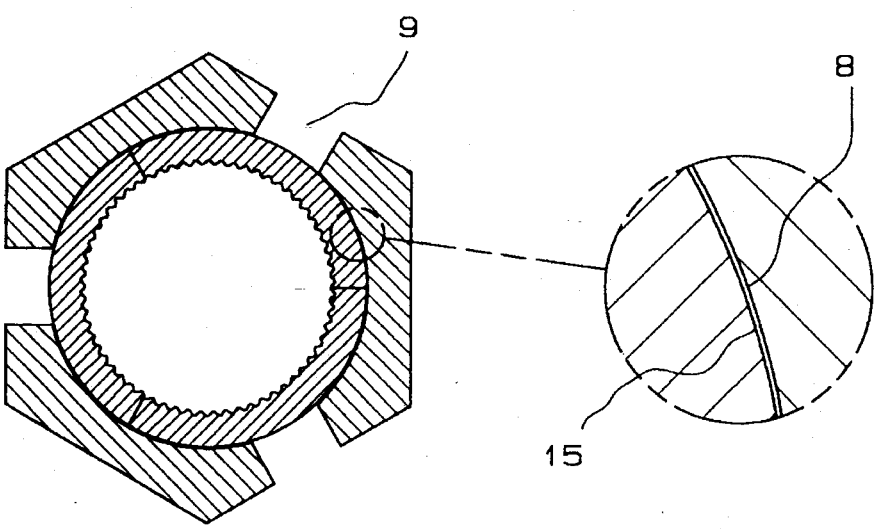
FIG. 19
FIG. 20

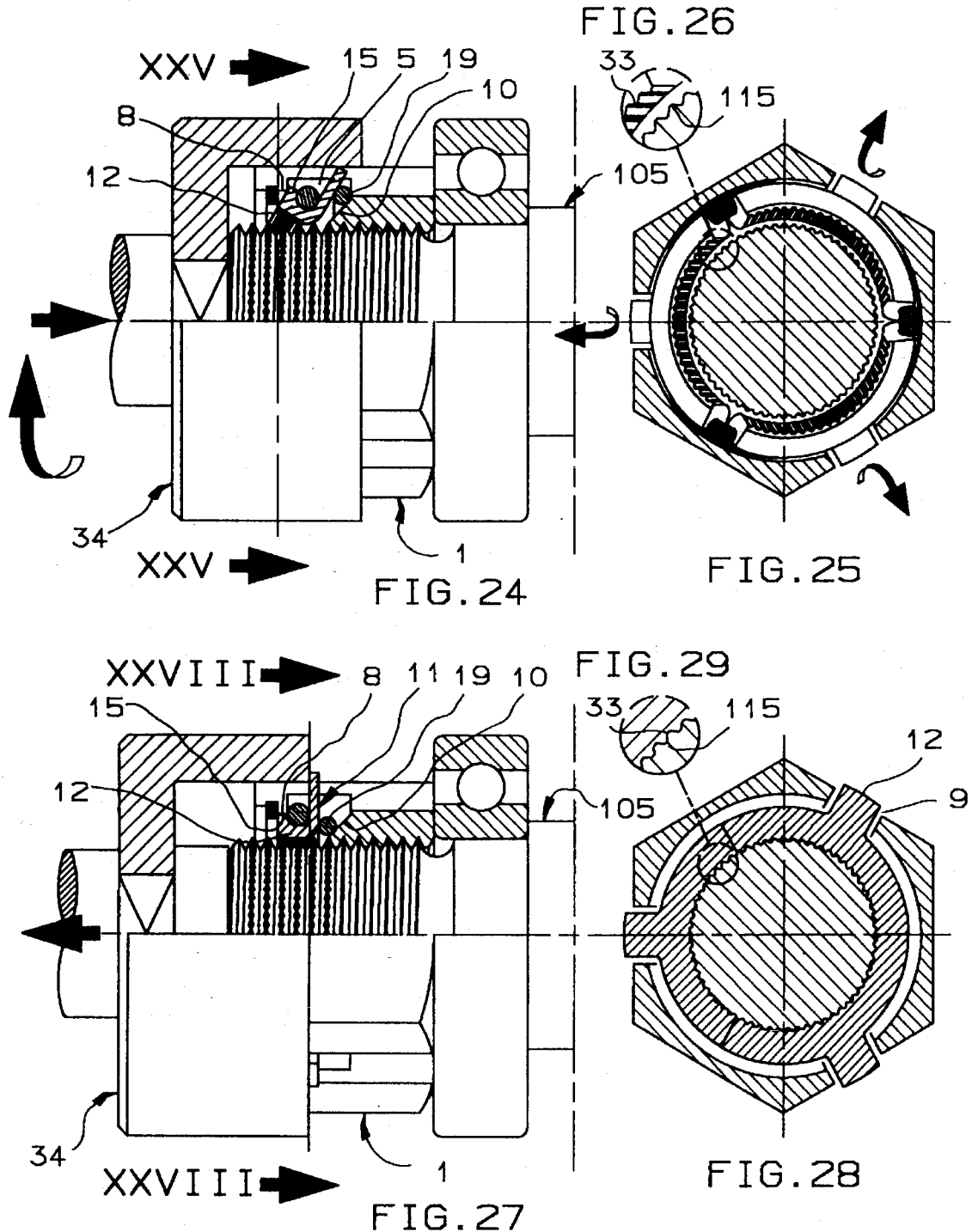

AUTOMATIC POSITIVE LOCKING NUT AND RELATED DEVICE FOR LOCKING AND UNLOCKING THE NUT ON A SHAFT

BACKGROUND OF THE INVENTION

Many types of nuts with positive locking are already known, the most common one is the castellated nut associated with a pin installed in a hole of the shaft on which the nut is screwed and which extends at one and the same time in this hole and in two crenels of the nut.

This particular type of nut has some disadvantages inherent to its structure, particularly an insufficient strength, a poor reaction to the vibrations and a limited effectiveness.

It has been improved by introducing a locking device in the nut with positive locking. This type of nut is particularly described in the documents FR-A-2 358 580 and U.S. Pat. No. 4,328,720.

Document EP-0 102 898 describes a particular example of a nut device with positive automatic locking intended to be fixed in rotation on the shaft and having a locking element.

In this document, the locking element has the shape of a threaded ring confined in a counterbore of the nut with which it is associated in rotation. The ring has serrations along its internal thread intended to cooperate with the complementary serrations of the threaded portion of the shaft when both threads of the ring and the nut are in phase.

Nevertheless, the effectiveness of such a nut may be compromised under the effect of vibrations.

Document FR-A-2 321 625 describes a lock nut comprising mainly a ring with internal serrations and an opened toric ring lodged in a circular groove located on the external part of this ring. One should note on the one hand that this ring is made in one piece, and on the other hand that this ring is in this case, acting as a retainer circular clip in the said nut to lock.

Document GB-A-547 624 mentions the possibility of a locking obtained by the pressure of the threads of the nut on those of the shaft, pressure obtained by a resilient toric opened ring pressing radially a rear and solidary skirt of the nut partially made malleable by radial millings. It will also be noted that the artificial segmentation obtained by millings in the nut is integrally making part of the nut. From another side, the obtained locking is a limited locking totally dependant of the friction capacities of the thread of the nut in relation to the thread of the screw.

SUMMARY OF THE INVENTION

The present invention provides an improved nut that may be locked surely and efficiently on a shaft, without the drawbacks of the nuts of the prior art, the locking being of positive automatic type.

In particular, the present invention aims at providing an improved nut intended for applications located in high vibrations levels. The nut according to the present invention will even have propensity to absorb and reduce the vibrations to which it is submitted.

The present invention concerns an automatic positive locking nut intended to be screwed onto a shaft having a serrated thread, said nut comprising a locking element with serrations on its internal diameter intended to fix the nut in rotation on the shaft, this locking element being confined in a counterbore of the nut and being axially movable in said counterbore between a first locking position and a second unlocking position characterized in that the locking element comprises a segmented, radially expandable serrated ring, the segmented ring being engaged by a generally coaxial resilient member which biases the serrated ring segments radially toward the axis of the nut.

The said locking position corresponds to the position for which the serrations of each segment of the locking element cooperate perfectly with the complementary serrations along the thread of the shaft, and the said unlocking position corresponds to the position in which the serrations of each segment of the locking element are totally disengaged from the serrations along the thread of the shaft.

The present invention also concerns a device to lock and unlock the nut on the shaft in accordance with the present invention characterized in that it comprises a hollow socket delimiting a housing adapted to receive the nut according to the present invention.

BRIEF DESCRIPTION OF THE DRAWINGS

The present invention may be better understood and its numerous objects and advantages will become apparent to those skilled in the art by reference to the accompanying drawing wherein like reference numerals refer to like elements in the several figures and in which:

FIG. 3 is a side view, partly in cross-section, of a locking nut in accordance with a first embodiment of the present invention, the cross-section being taken along line III—III of FIG. 4;

FIG. 4 is an end view of the nut of FIG. 3;

FIG. 5 is a cross-sectional view of the nut of FIG. 3 taken along the line V—V of FIG. 3;

FIG. 6 is an enlarged view depicting the junction area of the segments of the locking element of the nut of FIGS. 3–5;

FIG. 17 is a side elevational view, partly in cross-section, of a locking nut in accordance with a second embodiment of the present invention, FIG. 17 being a view being taken along line XVII—XVII of FIG. 18;

FIG. 18 is an end view of the nut of FIG. 17;

FIG. 19 is a cross-sectional view of the nut of FIGS. 17 and 18 taken along line XIX—XIX of FIG. 17;

FIG. 20 is an enlarged view of the junction area of a segment of the locking element and the body of the nut of FIGS. 17-19;

FIG. 24 is a side view, partly in cross-section, of an assembly comprising the locking nut of FIGS. 17-23, the shaft and part to be captured thereon of FIG. 1, and a novel locking-unlocking tool for use with the second embodiment of the invention, the nut being in the unlocked position;

FIG. 25 is a cross-sectional view of the assembly of FIG. 24 taken along line XXV—XXV of FIG. 24;

FIG. 26 is an enlarged view of the junction area of the segments of the locking element and the thread of the shaft as shown in FIG. 25;

FIG. 27 is a view similar to FIG. 24 showing the locking nut in the locked position;

FIG. 28 is a cross-sectional view taken along line XXVIII—XXVIII of FIG. 27;

FIG. 29 is an enlarged view of the junction area of the segments of the locking element and the thread of the shaft as shown in FIG. 28;

DESCRIPTION OF THE PREFERRED EMBODIMENTS

Figure 1:
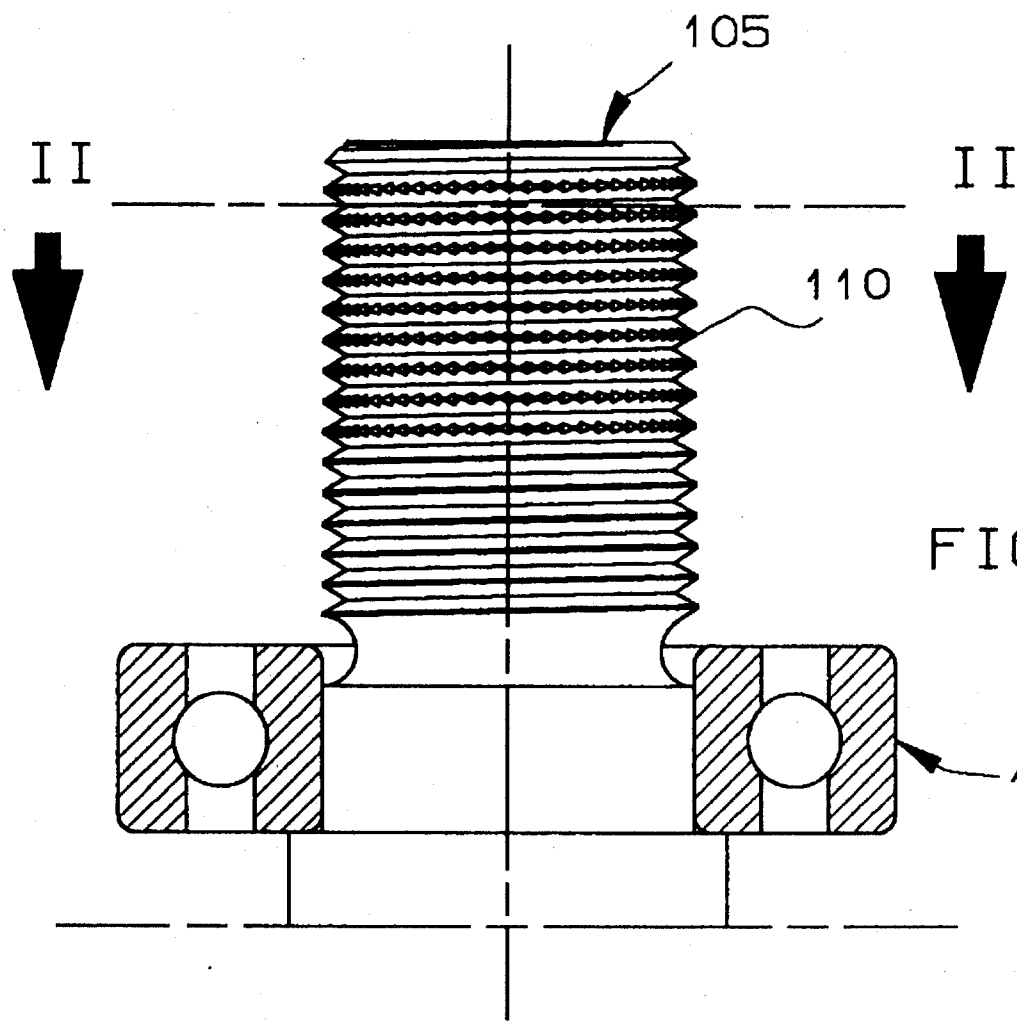
FIG. 1 is a side view of a threaded shaft and a cross-sectional view of a part to be captured on the shaft through use of the present invention.
Figure 2:
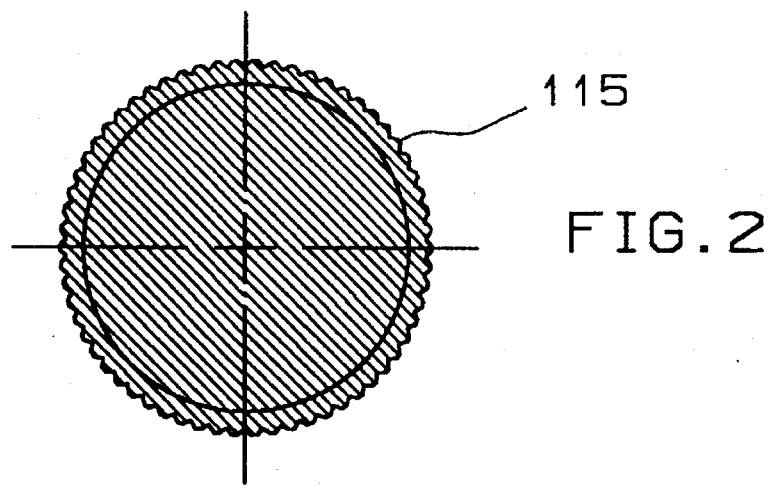
FIG. 2 is a cross-sectional view of the shaft of FIG. 1 taken along the line II—II of FIG. 1.

FIG. 1 shows a part, indicated generally at 100, which is to be secured on a threaded shaft 105 by means of a nut with positive automatic locking according to the present invention. One should note that the thread 110 of the shaft 105 shows a serrated profile 115 especially well represented in FIG. 2.

FIG. 3 represents the nut with positive automatic locking according to the first embodiment of the present invention. The upper half of the figure is represented in section, the lower half is represented in lateral elevation.

The automatic positive locking nut according to the present invention is indicated generally at 1. Locking nut includes a body 2 that has a central bore with an internal thread 3 and from which extends to the back a skirt 4 which delimits a counterbore 5. The counterbore 5 is a cavity with a cylindrical internal wall 6 that ends in a small edge 7 extending to the interior and delimiting a radial shoulder 8 which is best seen from FIG. 7.

The nut has moreover on its external surface four slots 9 obtained by milling and which are angularly equidistant. These slots are milled in the full thickness of the skirt 4 on and after the junction with the body 2.

The rear part of the 2 which extends to the counterbore 5 has the shape of a truncated cone defining in the counterbore 5, an outwardly diverging ramp 10.

Figure 8:
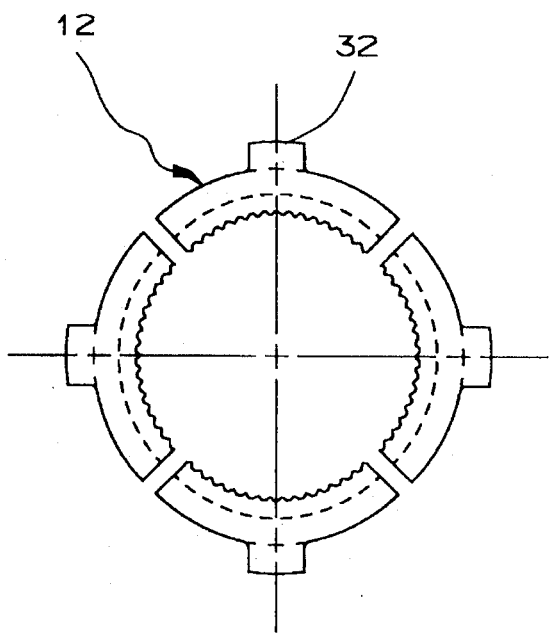
FIG. 8 is a front view of the segmented locking element of the locking nut of FIGS. 3–7, FIG. 8 being a view taken on line VIII—VIII of FIG. 7.

Advantageously, the locking element 11 made of four segments 12 has been set up into the counterbore 5 as it appears clearly on the FIG. 8.

The segments 12 of the locking element 11 have all on their external part a groove 13 of equal diameter and wherein will be fitted a resilient circular ring 14. Ring 14 biases the different segments 12 of the locking element 11 radially inwardly thus maintaining them in a perfect circular alignment with each segment being strongly pressed against the two adjacent segments.

As may be seen from Figure, the groove 13 is delimited by radial collars 15 and 16 which prevent any axial gap of the resilient circular ring 14 as well as the release of the latter from the groove 13.

Figure 7:
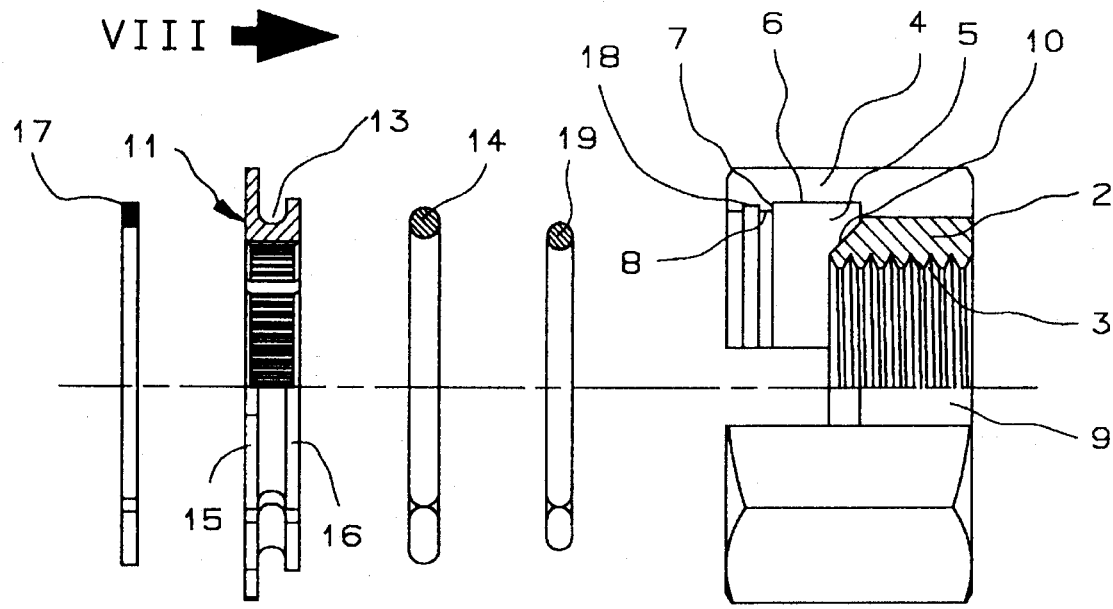
FIG. 7 is an exploded, side elevational view, partly in cross-section, of the locking nut of FIGS. 3–6.

As also represented at FIG. 7, the rear collar 15 has a diameter which is greater than the diameter of collar 16 and corresponds to the inner diameter of the radial shouldering 8 located in the counterbore 5. This arrangement will prevent radial displacement of the segments 12.

Moreover, each segment 12 of the locking element 11 has one tang 32, see FIG. 4 and 8, located in the median part of the locking element. In this way, the locking element will have four tangs 32 angularly equidistant allowing the locking element 11 to be fixed against rotation relative to the nut 1 by lodging the tangs 32 in the slots 9.

The locking element 11 is maintained in the counterbore 5 by a circular clip 17, itself located in a groove 18 machined in the rear part of the skirt 4 of the nut in order to hinder any displacement to the outside of the locking element 11 out of the counterbore 5.

A second resilient circular ring 19 is fitted between the collar 16 of the locking element 11 and the circular ramp 10. This ring 19 is radially preloaded so that when in place on the ramp 10, it exerts an axial force tending to push the locking element 11 against the retainer circular clip 17.

Figures 9, 10, 11:
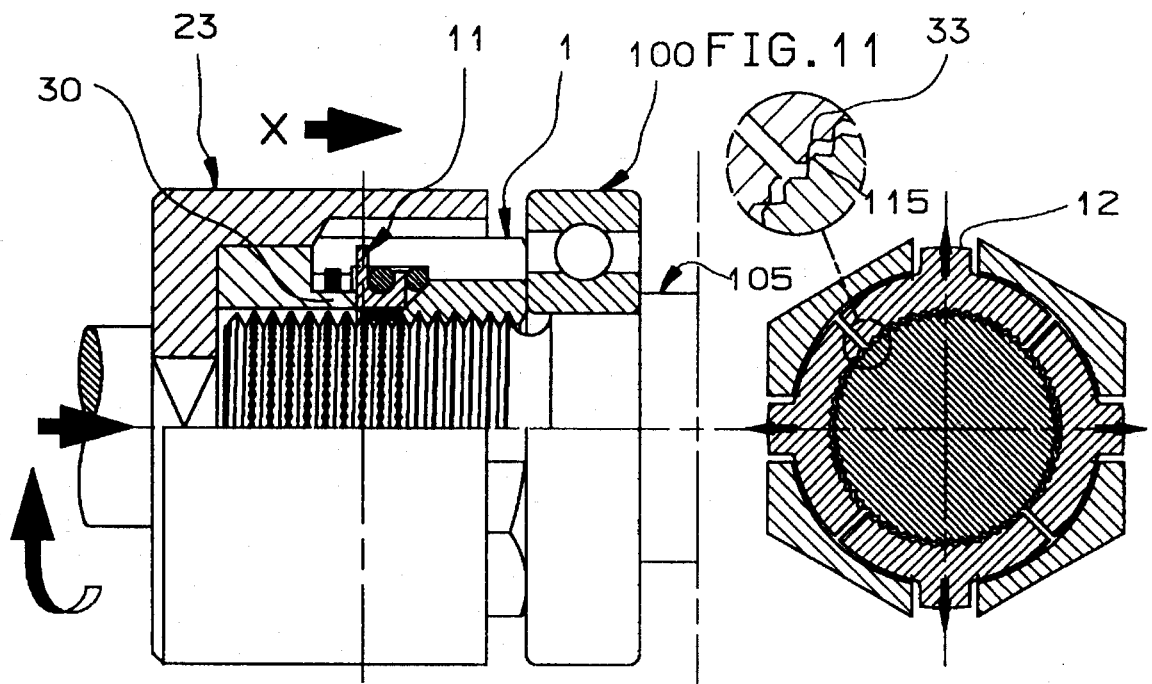
FIG. 9 is a side view, partly in cross-section, of an assembly comprising the nut of FIG. 3, the shaft and part to be captured of FIG. 1, a locking nut in accordance with the embodiment of FIGS. 3–8 and a tool for use with the locking nut, the nut being shown in the unlocked position.
FIG. 10 is a cross-sectional view of the assembly of FIG. 9 taken along line X—X of FIG. 9.
FIG. 11 is an enlarged view of a portion of FIG. 10, FIG. 11 depicting the junction area of the segments of the locking element and the thread of the shaft.
Figures 12, 13, 14:
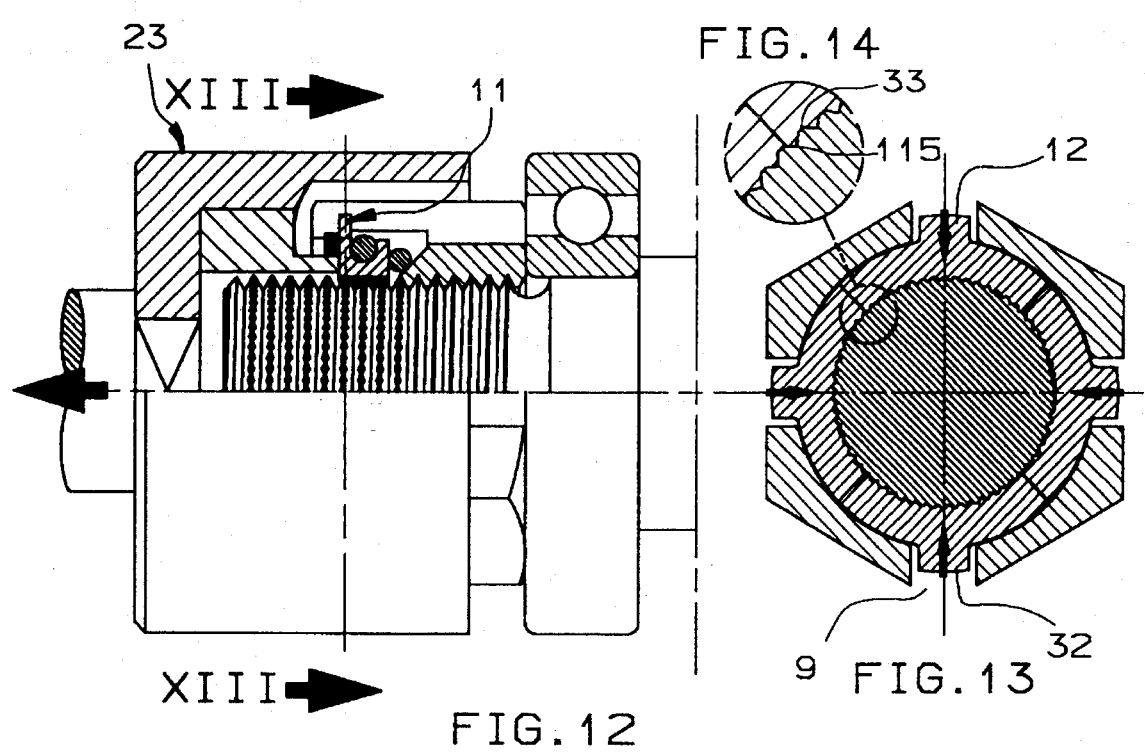
FIG. 12 is a view similar to FIG. 9 but showing the locking nut in the locked position.
FIG. 13 is a cross-sectional view of the assembly of FIG. 12 taken along line XIII—XIII of FIG. 12.
FIG. 14 is an enlarged view of a portion of FIG. 13, FIG. 14 depicting the junction area of the segments of the locking element and the thread of the shaft.

When an axial pressure is exerted on the locking element 11, element 11 can move in the counterbore 5 from said locking position represented in the FIG. 12 to said unlocking position represented in FIG. 9 and vice versa.

The transition from the said locking position to the unlocking position splits essentially up into two phases. The first phase consists in simply pushing back the ring 19, forcing it to expand radially and move up the ramp 10. The second phase occurs when the locking element 11 cooperates with the ramp 10 as shown in FIG. 9. The locking element 11 is comprised of four segments 12 held by a preloaded resilient circular ring 14. The segments 12 accordingly, move radially and thus apart from one another while going up the ramp 10. The result is an increase of the internal diameter of the locking element 11 allowing the disengagement of the serrations 33 located on the internal part of the different segments 12 from the corresponding serrations 115 located along the thread 110 of the shaft 105.

Figure 15:
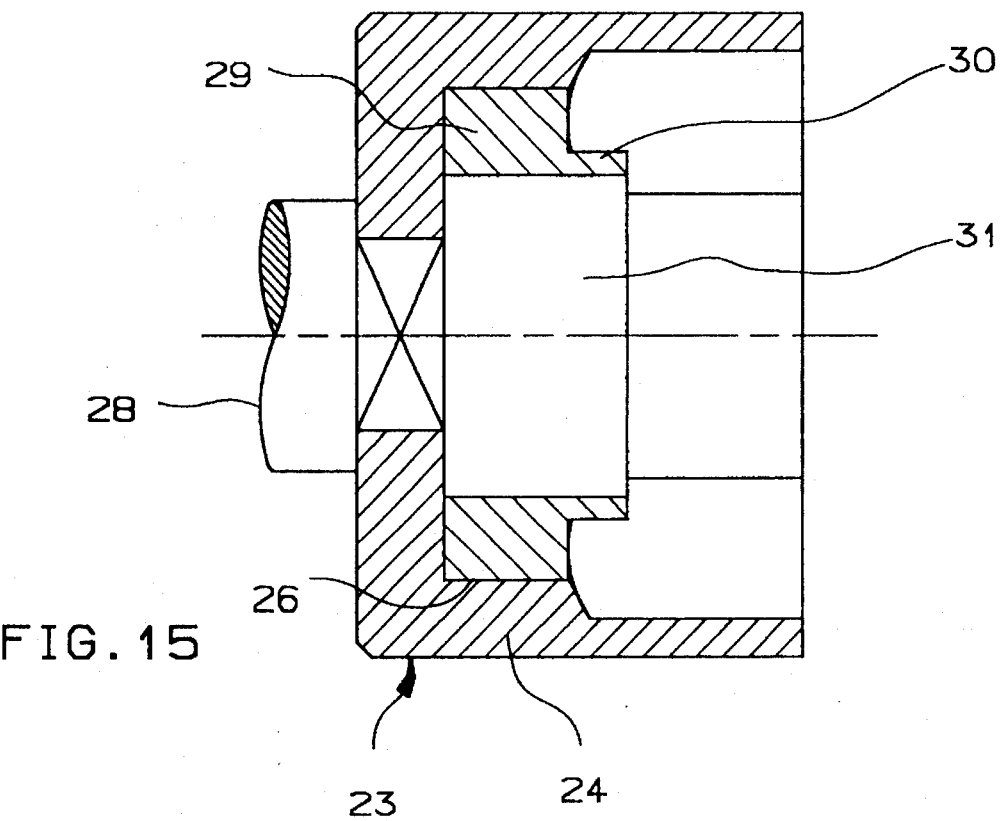
FIG. 15 is a cross-sectional, side elevation view of the novel locking-unlocking tool of FIG. 9.
Figure 16:
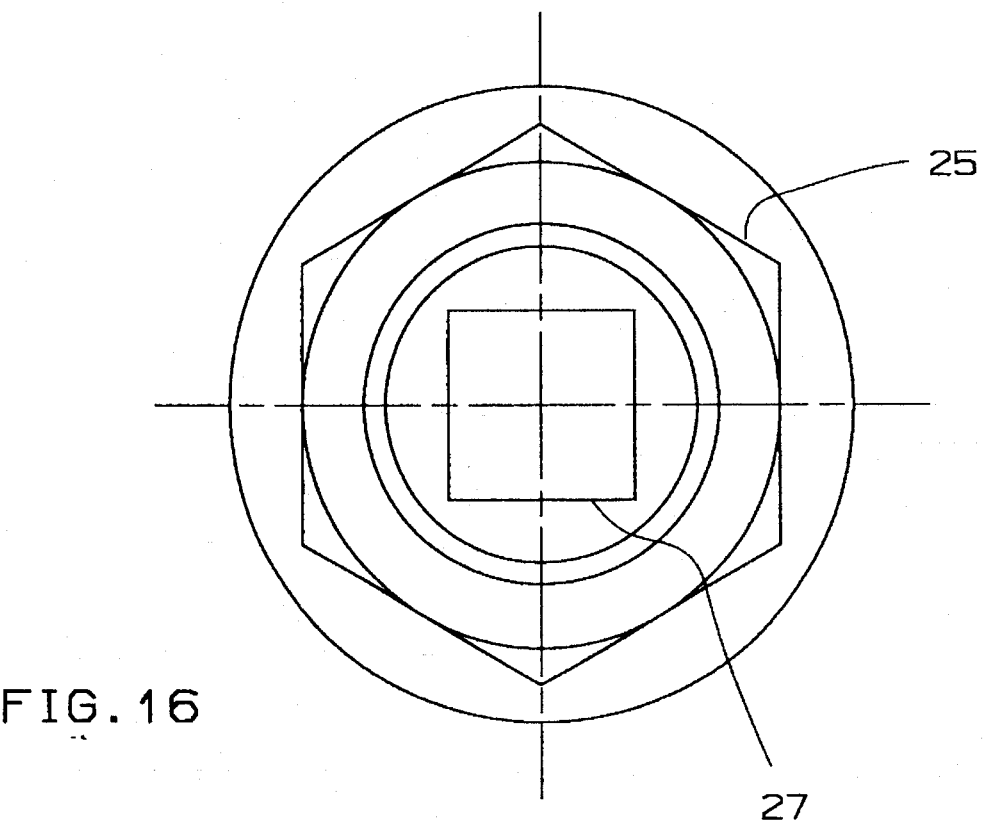
FIG. 16 is an end view of the locking-unlocking tool of FIG. 15.
Figure 21:
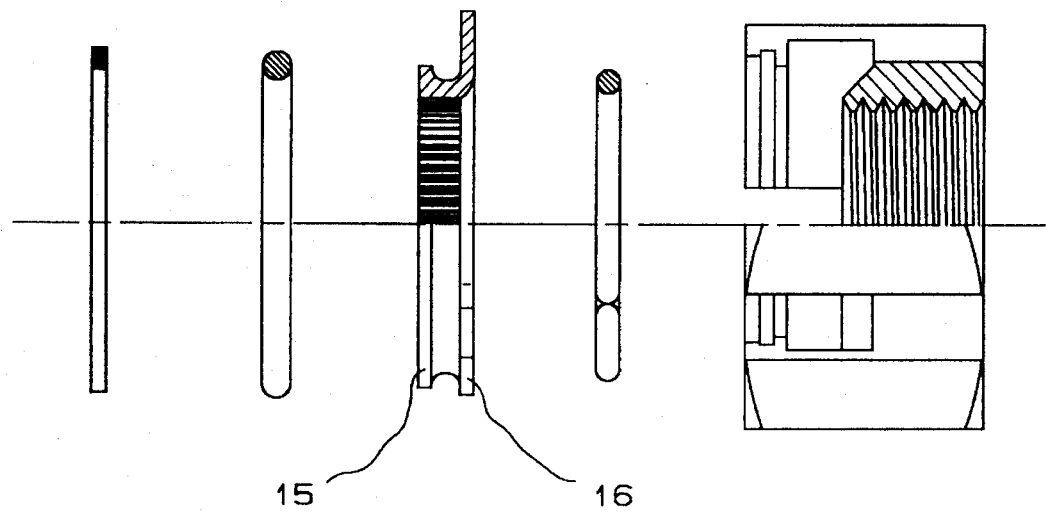
FIG. 21 is an exploded side elevational view, partly in cross section, of the nut of FIGS. 17-20.
Figure 22:
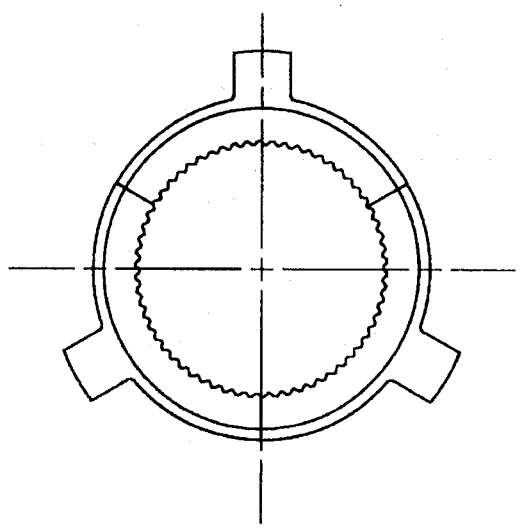
FIG. 22 is a front view of the locking element segments of the locking nut of FIGS. 17-21, FIG. 22 being a view taken along line XXII—XXII of FIG. 21.
Figure 23:
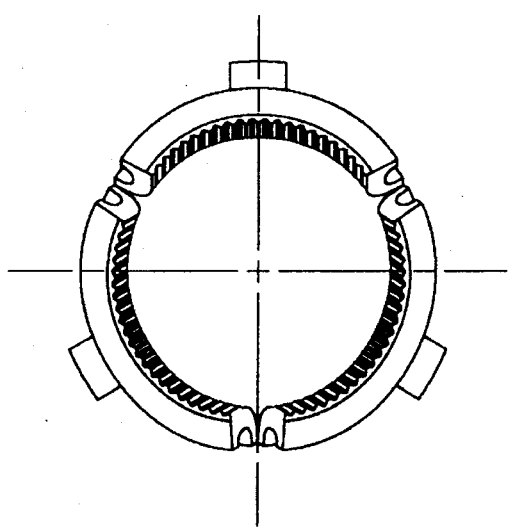
FIG. 23 is a front view of the locking element segments of the embodiment of FIGS. 17-21 in the unlocked position.

The rotation of the nut 1 intended Go tighten the element 100 on the shaft 105 and the motion of translation of the locking element 11 are executed by a locking-unlocking tool represented in FIGS. 15 and 16.

This locking-unlocking tool indicated generally at 23, essentially comprises an external cylindrical body 24 internally machined up to the shape of an hexagon 25 in its front part in order to match the hexagonal external shape of the nut 1. Tool 23 is cylindrical on its middle part and is broached by a square hole 27 on its rear part in order to be complementary to a commercially available drive tool 28.

The cylindrical central part 26 of tool 23 is crimped with a ring 29 having a thinner portion 30 intended to lean on the locking element 11 as well as a boring 31 in order to have a free entrance space for the shaft 105 (FIG. 1).

The unlocking of the nut from the shaft is perfectly represented on the FIGS. 9, 10 and 11.

The nut 1 previously introduced in the locking device 23 is unlocked from the shaft 105 by exerting a pressure and a rotational motion with the device 23.

Through imparting a radial motion to the locking segments 12 by exerting a pressure with the part 30 of the device 23 on the locking element 11, we achieve the disengagement of the existing serrations 33 in the segments 12 of the locking element 11 from the existing serrations 115 on the thread 110 of the shaft 105 the locking nut can then be rotated and be removed from shaft 105.

The pressure slack off on the tool 23 allow an opposite radial motion of the segments 12 of the locking element giving rise to a perfect engagement of the existing serrations 33 at the internal periphery of the locking element 11 with the existing serrations 115 on the thread 110 of the shaft 105, as represented on the FIGS. 12, 13 and 14.

According to a second embodiment, the disengagement of the serrations 33 of the locking element 11 from the serrations 115 of the shaft 105, obtained following the first embodiment by a radial motion, may also be obtained by a rotational motion of the segments 12 of the locking element around a geometrical axis going through perpendicularly and in its center, the perpendicular section of the resilient ring 14 that allow to embody the different segments 12.

This second embodiment will become more apparent in the ensuing FIGS. 17 to 31 where the same elements in the two embodiments have the same reference numbers.

According to this second embodiment, the circular ring 14 will be resilient in any direction; it may be for example made of elastomer or be a helicoidal spring.

As it clearly appears on the FIGS. 17 and 18, the tangs or tabs 32 located on each segment 12 of the three segment locking element 11 extend outwardly beyond the flat parts of the hexagonal external profile of the nut 1. In this manner if, as represented on the FIGS. 27 and 28, an axial pressure with an unlocking device having the shape of a standard hexagonal socket 34 commercially available is exerted on tangs 32 will force the resilient ring 19 to move up on the internal conical ramp 10 of the nut 1.

It will be noted that by exerting an axial pressure on the locking element 11, the radial collar 15 delimiting the groove restraining the circular ring 14, does not touch the internal cylindrical surface 8 of the counterbore 5 of the nut 1, as represented in FIGS. 19 and 20.

In this case, the three segments 12 of the locking element 11, as represented on the FIGS. 24 and 25, may rock in a rotational motion, as a consequence of the resiliency in any direction of the resilient circular ring 14.

This gives rise to the disengagement of the serrations 115 of the shaft 105 from the existing serrations 33 on the internal surface of the different segments 12 of the locking element 11, which allow the rotational motion of the nut on the shaft 105.

On the other hand, the pressure slack off on the tool 34 as represented on the FIGS. 27 and 28, allows the engagement of the serrations 115 of the shaft 105 with the serrations 33 of the segments 12 of the locking element 11 in order to lock the nut 1 on the shaft 105, thanks to the tangs 32 located in the slots 9 of the nut 1.

Figure 30:
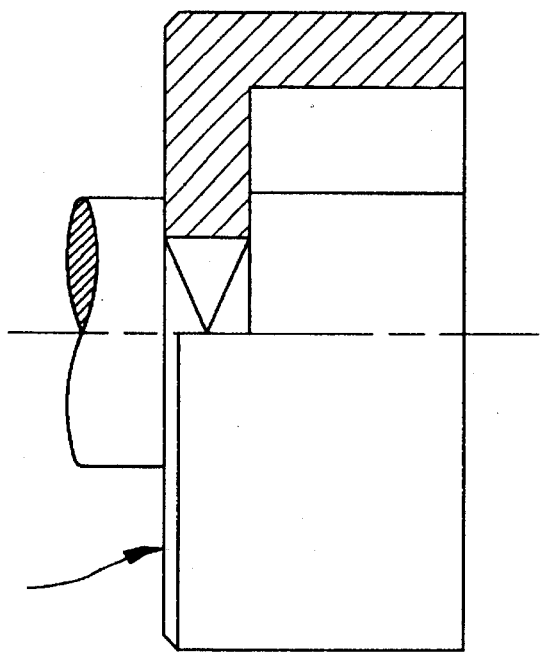
FIG. 30 is a side view, partly in cross-section, of the locking-unlocking tool of FIGS. 24 and 27.
Figure 31:
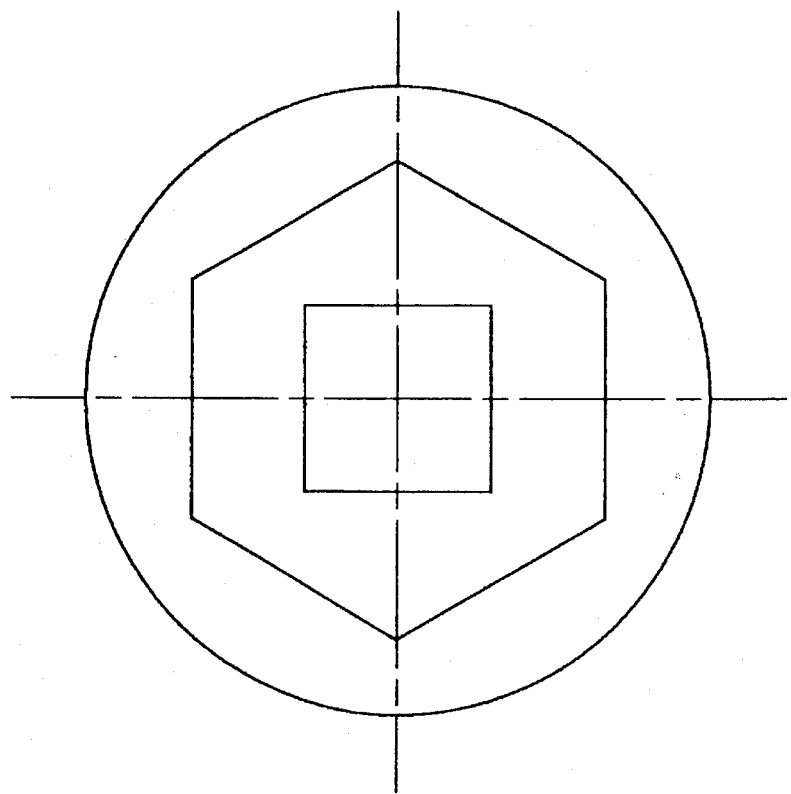
FIG. 31 is an end view of the locking-unlocking tool of FIG. 30.

One should note that the tool 34 shown in FIGS. 30 and 31, which is used for the locking and the unlocking of the nut 1 according to the second embodiment, is a perfectly standard socket with an internal hexagon.

I claim:

1. An automatic positive locking nut for cooperation with a shaft having a serrated thread portion, said nut comprising a locking element having serrations on its internal diameter for engagement with the serrated thread on the shaft to fix the nut in rotation on the shaft, said locking element being confined in a counterbore in said nut and being axially movable in said counterbore between a first locked position and a second unlocked position, said locking element comprising plural segments, said segments cooperating to define a ring which will be coaxial with a shaft on which the nut is installed, said nut further comprising a first resilient biasing ring which engages said plural segments and urges said segments radially inwardly toward said axis.

2. The locking nut of claim 1 further comprising a plurality of longitudinal slots in said nut, said slots being at least equal in number to the number of segments comprising said locking element, said slots being substantially angularly equidistant and in communication with said counterbore, said locking element segments each having a radially outwardly extending tang which engages a said longitudinal slot.

3. The nut of claim 1 wherein said segments are each provided with a recess in the outwardly facing surface thereof, said recesses cooperating to define a circumferential groove which extends around said locking element, said first biasing ring being received in said circumferential groove, said first biasing ring urging said segments into abutting end-to-end contact when said nut is in said first locked position.

4. The locking nut of claim 1 wherein said counterbore is defined by a cylindrical internal wall which extends, at one end, from a radial stop shoulder.

5. The locking nut of claim 1 further comprising:
a ramp surface extending into said counterbore, said ramp surface being generally in the shape of a truncated cone which diverges outwardly in an axial direction, said outward axial direction being the direction of movement of said locking element between said first and second positions, said locking element segments contacting said ramp surface during axial movement of said locking element whereby said segments will be caused to move radially outwardly against the bias of said first resilient biasing ring when said locking element moves from said first position to said second position.

6. The locking nut of claim 5 further comprising:
a second resilient biasing ring, said second biasing ring being in engagement with said ramp surface and applying an axial force to said locking element in a direction away from said ramp surface.

7. The locking nut of claim 3 wherein said recesses are defined by a pair of axially displaced, radially extending collars.

8. The locking nut of claim 7 wherein said counterbore is defined by a cylindrical internal wall which extends, at one end, from a radial stop shoulder.

9. The locking nut of claim 8 wherein a first of said recess defining radial collars has an outer diameter which is approximately equal to the inner diameter of said stop shoulder, said first recess defining collar being in circumferential engagement with said stop shoulder when said locking element is in said first position whereby radial movement of said locking element segments is prevented.

10. The locking nut of claim 1 further comprising:

retaining ring means mounted in said nut at said first end of said counterbore, said retaining ring means capturing said locking element in said counterbore.

11. The locking nut of claim 2 wherein said tangs extend outwardly beyond the periphery of the nut for engagement by a tool.

12. The locking nut of claim 6 further comprising a plurality of longitudinal slots in said nut, said slots being at least equal in number to the number of segments comprising said locking element, said slots being substantially angularly equidistant and in communication with said counterbore, said locking element segments each having a radially outwardly extending tang which engages a said longitudinal slot.

13. The nut of claim 6 wherein said segments are each provided with a recess in the outwardly facing surface thereof, said recesses cooperating to define a circumferential groove which extends around said locking element, said first biasing ring being received in said circumferential groove, said first biasing ring urging said segments into abutting end-to-end contact when said nut is in said first locked position.

14. The locking nut of claim 13 further comprising a plurality of longitudinal slots in said nut, said slots being at least equal in number to the number of segments comprising said locking element, said slots being substantially angularly equidistant and in communication with said counterbore, said locking element segments each having a radially outwardly extending tang which engages a said longitudinal slot.

15. The locking nut of claim 14 wherein said counterbore is defined by a cylindrical internal wall which extends, at one end, from a radial stop shoulder.

16. The locking nut of claim 15 wherein said recesses are defined by a pair of axially displaced, radially extending collars.

17. The locking nut of claim 16 wherein a first of said recess defining radial collars has an outer diameter which is approximately equal to the inner diameter of said stop shoulder, said first recess defining collar being in circumferential engagement with said stop shoulder when said locking element is in said first position whereby radial movement of said locking element segments is prevented.

18. The locking nut of claim 17 further comprising:

retaining ring means mounted in said nut at said first end of said counterbore, said retaining ring means capturing said locking element in said counterbore.

19. The locking nut of claim 3 further comprising:

a ramp surface extending into said counterbore, said ramp surface being generally in the shape of a truncated cone which diverges outwardly in an axial direction, said outward axial direction being the direction of movement of said locking element between said first and second positions, said locking element segments contacting said ramp surface during axial movement of said locking element whereby said segments will be caused to move radially outwardly against the bias of said first resilient biasing ring when said locking element moves from said first position to said second position.

20. Apparatus for selectively locking and unlocking a nut against rotation about a threaded shaft, the nut and shaft having cooperating serrated threads, the nut to be locked and unlocked having an irregular outer shape and a radially expandable locking element, the locking element being disposed in a counterbore of the nut and being axially movable relative to the shaft between a first locking position and a second unlocking position, said nut having a minimum inner diameter in a portion extending from a first end thereof to the locking element which is greater than the outer diameter of the shaft, said apparatus comprising:

housing means defining a socket for receiving said nut, said housing means having a portion with an internal shape complementary to the outer shape of the nut, said housing means also having a portion to which axial and rotational force may be applied; and actuating means disposed in said housing means bore, said actuating means including an annular shoulder which contacts a radially extending side surface of the locking element to cause movement thereof in the counterbore, said actuating means having a first portion which includes said annular shoulder and defines an opening sized and shaped to receive the shaft, said actuating means annular shoulder having inner and outer diameters which enable said shoulder to pass between the shaft and said nut in the said portion thereof which extends from said first end of said nut.

* * * * *